United States Patent [19]

Sykes

[11] Patent Number: 4,784,264
[45] Date of Patent: Nov. 15, 1988

[54] DISPLAY ALBUM

[76] Inventor: Philip K. Sykes, 5865 Fernwood, Shoreview, Minn.

[21] Appl. No.: 170,021

[22] Filed: Feb. 3, 1988

Related U.S. Application Data

[63] Continuation of Ser. No. 935,503, Nov. 26, 1986, abandoned.

[51] Int. Cl.⁴ .............................................. B65D 85/67
[52] U.S. Cl. .................. 206/387; 206/45.34; 206/312; 206/459; 206/472
[58] Field of Search .............. 206/232, 309, 310, 311, 206/312, 324, 387, 389, 444, 472, 493, 45.34, 459; 220/339

[56] References Cited

U.S. PATENT DOCUMENTS

| | | | |
|---|---|---|---|
| 1,356,815 | 10/1920 | Foresman | 206/311 |
| 3,112,966 | 12/1963 | Reid | 206/309 |
| 3,483,965 | 12/1969 | Rosenblatt et al. | 206/424 |
| 3,743,081 | 7/1973 | Roberg et al. | 206/472 |
| 3,902,598 | 9/1975 | Koob et al. | 206/387 |
| 4,011,940 | 3/1977 | Neal et al. | 206/387 |
| 4,054,206 | 10/1977 | Kobayashi et al. | 206/387 |
| 4,098,402 | 7/1978 | Rogg | 206/387 |
| 4,184,594 | 1/1980 | Hehn | 220/339 |
| 4,293,266 | 10/1981 | St. Lawrence et al. | 220/339 |
| 4,333,568 | 6/1982 | Weldin | 206/459 |
| 4,341,307 | 7/1982 | Shyers | 206/387 |
| 4,363,403 | 12/1982 | Raucci, Jr. et al. | 206/387 |
| 4,383,607 | 5/1983 | Lordahl et al. | 206/45.34 |
| 4,407,410 | 10/1983 | Graetz et al. | 206/339 |
| 4,432,827 | 2/1984 | Graetz et al. | 156/245 |
| 4,501,361 | 2/1985 | Rose, Jr. | 206/493 |
| 4,518,275 | 5/1985 | Rauch, III et al. | 402/80 |
| 4,519,500 | 5/1985 | Perchak | 206/472 |
| 4,635,797 | 1/1987 | Bankier | 206/387 |
| 4,641,750 | 2/1987 | Johnson et al. | 206/472 |

FOREIGN PATENT DOCUMENTS 2503667   4/1981   France .................... 206/493

Primary Examiner—David T. Fidei

[57] ABSTRACT

A display album is described which is composed of an inner tray sheet vacuum formed to provide an upper and lower tray inside the front and back cover of the album respectively to receive a cassette, the trays comprising cooperating interconnecting tray walls along the top and bottom edges of the album and along the outside free edge of the album but having an open center in a spine region between the trays so that the contents of the album can be clearly seen through a spine formed from transparent material that extends between front and rear covers of the album. An outer flexible transparent plastic sheet is bonded to at least three edges of the tray sheet to form the outer surface of the album. If desired, printed display sheets can be inserted between the inner and outer sheets from which the album is formed.

9 Claims, 2 Drawing Sheets

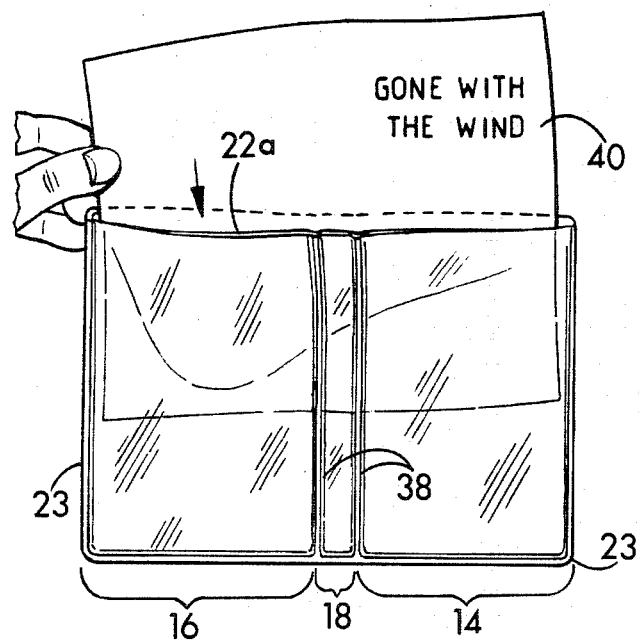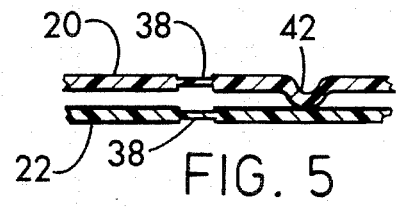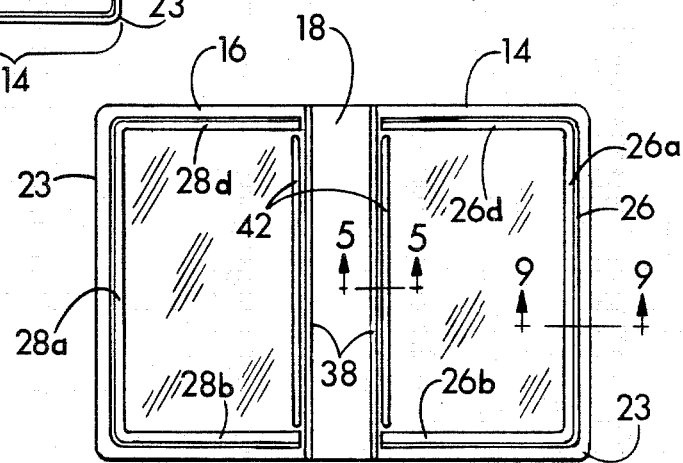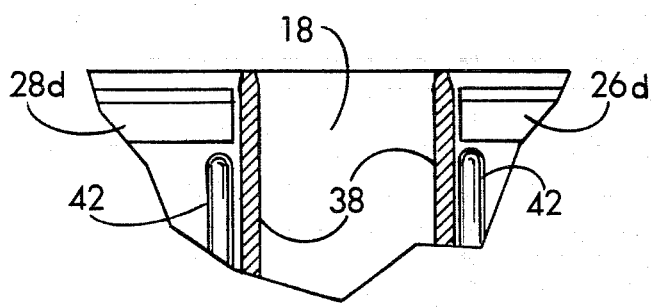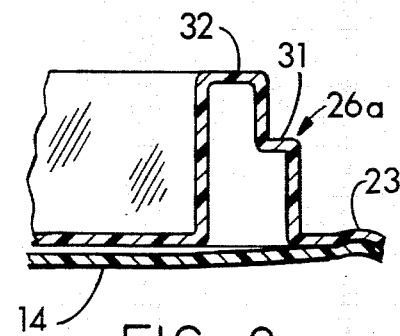

DISPLAY ALBUM

This is a continuation of application Ser. No. 935,503, filed Nov. 26, 1986, abandoned.

FIELD OF THE INVENTION

The present invention relates to a book-style album and more particularly to an album formed from plastic material.

BACKGROUND OF THE INVENTION

A variety of book-style albums have been previously proposed for audio and video cassettes. While the invention is adapted to both of these applications and others, it is particularly well suited for use with video cassettes that are to be rented or sold.

At the present time, it is common practice in video rental outlets to display video cassette programming in special albums or packaging known as "sleeves" which bear the title of the video program on the external surface of the album or sleeve. In some rental agencies, because of concern with cassette theft or damage to the original sleeve packaging, the cassette is removed for safekeeping and a styrofoam block inserted into the program's sleeve for rigidity. The sleeve, or in the case of an album, is then shrink-wrapped for protection against handling damage. All such shrink-wrapped video packaging, which may run into the thousands of individual title packages, must be provided by the renter at extra cost. In fact, this shrink-wrapping does not sustain repeated inspection and requires the renter to repeat this shrink-wrapping several times. Other forms of clear film material have been attempted to solve this problem, including rigid sheets of clear PVC folded to enclose the album or sleeve. These clear folded PVC sheets have proven to be a marginal improvement over shrink-wrapping, but do not wear well and are unsuitable for the rental packaging of video cassette programming. Moreover, they are difficult to open due to the rigidity of the material and construction, and do not allow for the easy removal of styrofoam inserts or the insertion of the video cassette to be rented.

In the course of developing the present invention, it was decided that an album configuration offered the best general design for durability and economies of use. However, there were shortcomings to even the album design in that the cassette or a sleeve containing the cassette cannot be seen clearly when within the album and, even if the albums were made from transparent material, trays and other parts used for holding objects in the album would obscure printed material on the cassette. For convenience in the present application, the term "cassette" will be used even though the cassette itself is contained within a tight fitting sleeve or box and has reference to the cassette itself and/or the sleeve or box enclosing it.

Even if cassettes contained in prior albums were not obscured by the opaque material from which the albums are formed or by the presence of tray walls and the like, other articles in prior albums obscure the cassette making it either difficult or impossible to see the cassette clearly or to easily insert and remove the cassette from the album. U.S. Pat. Nos. 4,341,307; 4,432,827; 3,902,598; 4,054,206 and 4,407,410 are examples of book-style cassette holders having rectangular complimentary interfitting trays adapted to receive cassettes or other objects. In addition to the fact that the albums are formed from opaque materials, the walls of the trays obscure the articles inside, making it impossible to read the title of the video from outside the album. U.S. Pat. No. 4,518,275 describes a package and storage container for diskettes in which flat diskettes are held in a front cover pocket. A three-ring binder is provided for sheet material in the back cover. Even if an attempt were made to use this as a cassette holder, the three rings of the binder would be in the way, making it less convenient to insert and remove cassettes, and would partially obscure the title bearing edge of the cassette closest to the spine.

In view of the shortcomings of the prior art, it is a major objective of the present invention to provide an improved book-style album for audio and video cassettes wherein a way can be found to enable the cassettes to be clearly seen within the albums. Another object is to provide an improved album that is suited for use as a display unit for cassettes that are being rented or sold. Yet another more specific object is to provide an improved cassette album for holding and displaying cassettes in such a way that the titles and other printed indicia along one edge of the cassette can be viewed while the cassette is displayed within the album on a display shelf. A further object of the invention is to provide an improved album of the type described using fewer component parts and in a specific preferred form of the invention, only two sheets of material optionally including a pocket or trap for one or more printed insert sheets which, in the case of a video cassette, might include the title and a picture of one or more of the actors or a scene from the video.

These and other more detailed and specific objects of the invention will be apparent in view of the following detailed description and drawings which illustrate the invention by way of example.

THE FIGURES

FIG. 5 is an enlarged partial transverse sectional view taken on line 5—5 of FIG. 8.

FIG. 6 is a view of the outside of the album while in an open condition with a single insert sheet partially inserted into a pocket provided in the album.

FIG. 7 is a partial enlarged view of a modified form of album in an open position.

FIG. 8 is a view of the album shown in FIG. 7 on a reduced scale showing the entire album in an open condition and FIG. 9 is a partial transverse sectional view taken on line 9—9 of FIG. 8.

DESCRIPTION OF THE PREFERRED EMBODIMENTS

Figure 1:
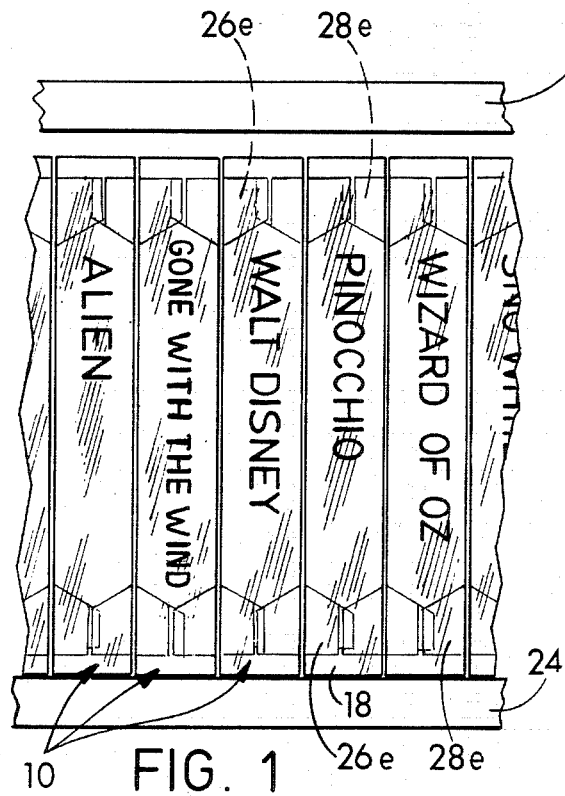
FIG. 1 is a partial elevational view of several albums embodying the invention, each containing a cassette as the albums appear on a display shelf.
Figure 2:
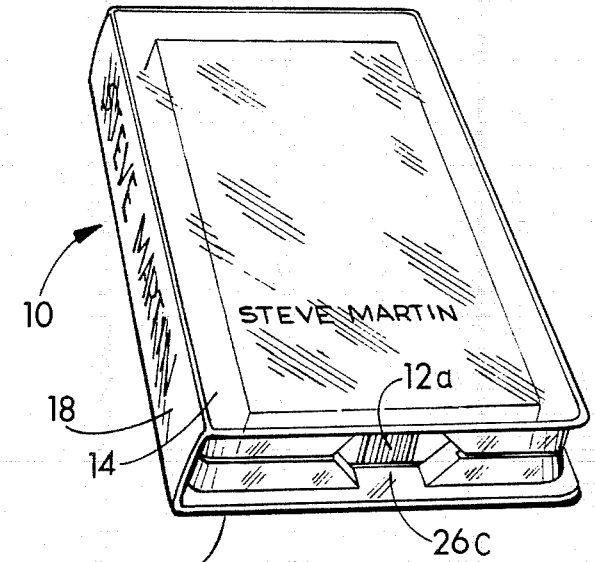
FIG. 2 is a perspective view of an album embodying the invention with a cassette inside.
Figure 3:
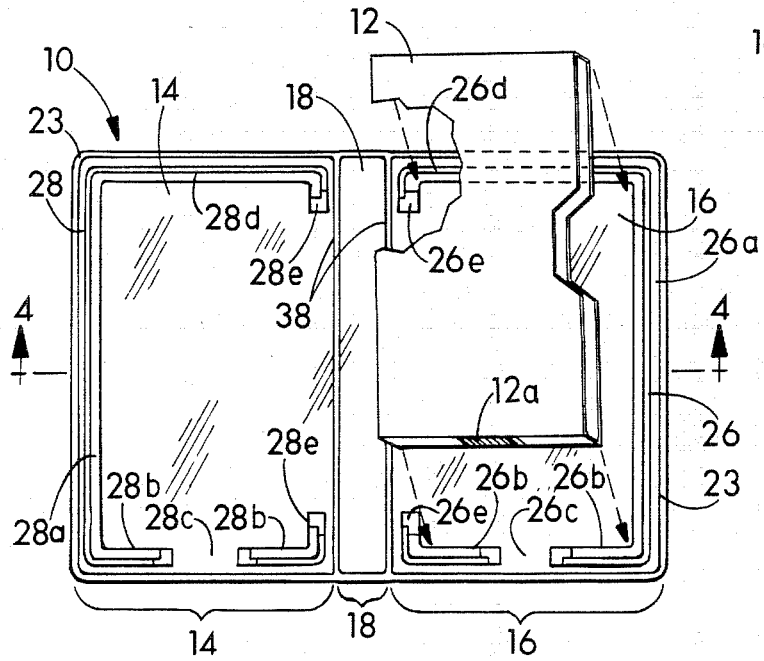
FIG. 3 is a plan view of the album of FIGS. 1 and 2 in an open position with the cassette partially removed.
Figure 4:
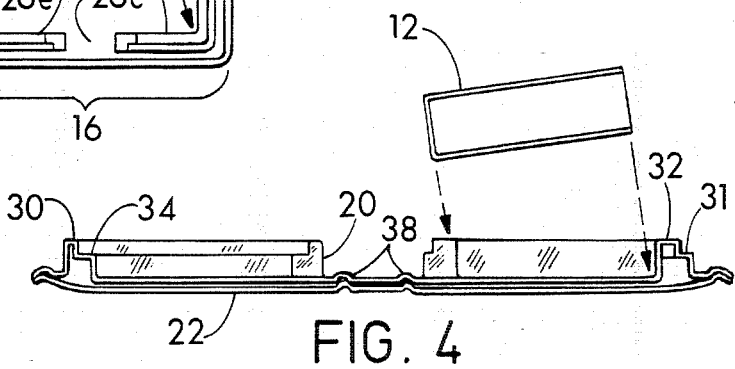
FIG. 4 is a transverse sectional view taken on line 4—4 of FIG. 3.

Refer now to the figures and particularly to FIGS. 1-4 which illustrate a book-style album 10 in accordance with the present invention for holding a cassette illustrated diagramatically and designated 12 in FIGS. 3 and 4, the cassette being represented by the sleeve or box which comes with the cassette. Both the sleeve and cassette form no part of the present invention and will be referred to either together or singly for convenience by the term "cassette." The album includes front and back laterally spaced apart covers 14 and 16 connected together by a central vertically disposed spine 18 to which the covers 14 and 16 are preferably hinged by means of hinges 38.

The album is preferably formed from two flat sheets preferably composed of plastic including an inner tray sheet 20 typically of clear thermoformable unplasticized plastic resin such as polyvinylchloride and a second outer sheet 22 of generally the same size and outline. The sheets 22 and 20 are bonded together preferably by means of a thermal bond, i.e., by forcing the edges thereof together under heat and pressure along a seal 23 extending around the sides and bottom of the tray sheet 20. While the peripheral seal 23 may be employed around the entire periphery including the top edge of the album, the sheet 22 is preferably left unsealed along its upper edge 22a as shown in FIG. 6 to provide a pocket or trap into which a printed display or title sheet 40 can be inserted if the invention is to be used in an application for which a title sheet or trap sheet 40 is desired. The sheet 22 is preferably formed from a relatively soft supple clear plastic sheet material such as a plasticized polyvinylchloride sheet. The tray sheet 20 and the album sheet 22 are both preferably about 12 to about 16 gauge.

As seen in FIGS. 2, 3 and 4, the tray sheet 20 is deflected preferably by thermoforming, e.g., vacuum forming, to define a pair of left and right cooperating and interfitting cassette receiving trays 28 and 26. The tray 26 includes a tray wall composed of a longitudinally extending tray wall portion 26a adjacent the right edge of the album and a tray bottom wall composed of two aligned sections 26b having a gap 26c between them near the center of the bottom edge of the rear wall to provide a bar code access aperture for the bar code 12a printed on the bottom edge of the cassette 12. The tray also includes a transversely extending top wall 26d and cassette holding projections 26e extending longitudinally of the spine from the top and bottom portion 26d and 26b of the tray wall closest to the spine 18. The projections 26e serve as stops for bracing the cassette 12. It will be seen that the stops 26e terminate in close proximity to the top and bottom of the spine to provide an open center area between their centrally facing ends through which the cassette and any printing thereon can be seen through the spine as shown in FIG. 1 which illustrates several of the albums in place on a display shelf. As shown in FIG. 1, the title or other information printed along the edge of the cassette 12 adjacent to the spine 18 can be clearly seen through the spine between the projections 26e.

In a similar manner, the front cover 14 is provided with a tray 28 including inwardly deflected tray walls composed of a longitudinal wall 28a, a bottom wall made up of two parts 28b separated by an aperture 28c so that the bar code 12a can be easily seen. Along the top edge of the album is the top wall 28d of the tray 28. The wall of tray 28 also includes cassette holding projections 28e which extend longitudinally with respect to the spine from the top and bottom portions of the wall 28 closest to the spine 18. These projections 28e again serve as stops for bracing the cassette and a terminate close to the top and bottom of the spine to provide an open center area between them through which the cassette and printed material thereon can be clearly seen through the spine 18 as shown in FIG. 1 depicting movie titles and production studios as they can be seen through the spine 18 in the unobstructed open area between the stops 26e and 28e. The tray walls can be of various shapes but the ones illustrated are shown with interfitting edges. Thus, the tray 28 as shown in FIG. 4 is provided with an outer peripheral extension 30 that seats within a recess 31 in the tray wall 26 while the latter is provided with a central extension 32 that rests within a central recess 34 in the wall of tray 28 in the front cover 14. The trays 26 and 28 can have different configurations known to those skilled in the art provided the tray wall is substantially absent in the spine area to provide an open center in the tray. The open center is substantially free from obstructions or other articles that would obscure the visible indicia on the cassette especially along the side edge of the cassette closest to the spine. In some cases, a tray may not be needed on both the front and back cover of the cassette, in which event a tray is provided on one cover while the other mating cover is flat.

The hinges 38 which are preferably provided along each edge of the spine 18 can, if they are used, be formed by temporarily placing a release or slip-sheet between the sheets 20 and 22 during manufacture and, when that has been done, pressing them between two longitudinally extending parallel heated bars which reduce the thickness of the sheets to form the hinges. The slipsheet is then removed so that the sheets 20 and 22 are not sealed together at the hinges 38. The hinges 38 can also be seen in cross-section in the embodiment illustrated in FIG. 5.

Refer now to the modified form of the invention shown in FIGS. 5, 7, 8 and 9 wherein the same numbers refer to corresponding parts already described.

In this embodiment of the invention, the projections 26e and 28e are not used. The inner ends of the lower and upper tray walls 28b and 28d extend all the way to the hinges 38 as shown in FIG. 7 and terminate adjacent to the hinges 38. The cassette in this instance extends all the way to the hinge 38 and when the album is closed is prevented from shifting laterally by the walls 26a and 28a on one side and by the spine 18 itself. The embodiment of FIGS. 5 and 7-9 has the advantage of placing the cassette closer to the spine but is slightly less rigid. To improve the strength and rigidity of the album, a pair of longitudinally extending parallel and laterally spaced apart reinforcing grooves 42 are formed into the tray sheet 20. The reinforcing grooves or corrugations preferably extend between the central or inner ends of the tray walls to give the album greater stiffness.

It can be seen that the albums in accordance with the present invention protect and help display the cassettes and give them much greater visual appeal. In addition, they allow the title or other printed indicia on the cassette to be easily seen both through the front cover 14 as seen in FIG. 2 and also through the spine 18 as shown in FIG. 1. In addition, a display sheet or trap sheet 40 can be inserted for certain applications where such a sheet is desired. The trap sheet 40 need not extend through both covers but can, if desired, be used in only one of them or can consist of two separate sheets, one for the front cover and one for the rear. The invention has a very low cost because only two plastic sheets are required and thus it can be employed in a variety of uses for displaying cassettes and other objects. By reversing the display sheet 40, the display advertising can be made to face the inside of the cover if desired. The invention is adapted to a variety of uses but is particularly well adapted for the display, rental or sale of video cassettes and in such applications has the following functions. It serves as a display container on the store shelf, it can easily be examined with a light pen through the aperture 26c to record the bar code and, after it is rented or sold, it serves as a handling or shipping container. Thus, a single album serves as a display vehicle, a rental vehicle allowing the use of bar code detection, and there is no need to transfer the cassette to a separate album at the point of sale or rental, thus making the clerk's work easier and avoiding the requirement of separate albums. It also saves money for the rental dealer who is concerned about a theft problem because the contents of the album can be clearly seen.

Many variations of the invention within the scope of the appended claims will be apparent to those skilled in the art once the principles described herein are understood.

What is claimed is:

1. A book-style album for a cassette having a visible indicia along one side edge thereof, said album comprising front and rear covers,
   a transparent spine connecting said covers together, said album including an inner tray sheet and an outer sheet bonded to one another,
   at least one of the covers having a cassette receiving tray comprised of thin-walled sheet plastic prepared from a flat sheet by vacuum forming or the like, said tray including a major wall having a flat inner face that is free from cassette supporting projections and said face being bounded by three channel-shaped walls including a top tray wall, a bottom tray wall and a side tray wall extending respectively along a top edge, a bottom edge and along a free side edge of one of said covers,
   said channel-shaped walls of the tray projecting inwardly from one cover in the direction of the other cover to define a tray receiving pocket therewithin,
   the tray receiving pocket being sized to receive the cassette with the edge having the printed indicia located adjacent to the spine of the album,
   cassette holding means on the album adjacent said one side edge of the cassette where the printed indicia is located and being adapted to contact one edge of the cassette closest to the spine to serve as stop means for bracing the cassette, whereby the cassette is enclosed on four sides and retained in place solely by said top, bottom and side walls and by the cassette holding means,
   the tray wall being substantially absent in the spine area to provide an open center in the wall of the tray aligned with the visible indicia on the cassette, said open center being substantially free from obstructions or other articles that would obscure the visible indicia on the side edge of the cassette whereby the printed indicia thereon can be seen through the album spine due to the clear field of vision provided by the open center when the cassette is placed in the album.

2. An album for holding a cassette or other object comprising a first sheet formed from plastic material having a front cover portion, a back cover portion and a transparent spine portion between the front and back cover portions, the front and back covers being laterally spaced in side-by-side relationship on opposite sides of the spine, bendable hinges between the spine and the covers, at least one of the covers having an inwardly deflected tray including a two part tray wall including a first portion extending around the top edge, a free side edge and a portion of the bottom edge of the cover and a second portion at the bottom edge of the cover spaced from the first portion by an aperture for viewing a portion of the cassette, said tray wall defining a cassette receiving pocket therebetween, said tray receiving pocket having a flat inner surface,
   cassette holding means on the album adjacent the spine and adapted to contact one edge of the cassette closest to the spine to serve as stop means for bracing the cassette, said album being free from obscuring obstructions at least through the majority of the spine area to define an unobstructed open center aligned with visible indicia on the cassette between the spine and the cassette, a second outer sheet having at least a center portion in the spine region formed from transparent material, a bond connecting said tray sheet and said outer sheet together around a substantial portion of the periphery thereof, whereby the cassette and visible indicia printed thereon will be visible through the superimposed tray sheet and the outer sheet in the spine portion of the album due to the clear visibility afforded by the open center area between the ends of the first and second tray walls closest to the spine.

3. The album of claim 2 wherein said album is provided with longitudinally extending laterally spaced apart parallel spine rules defining hinges on either side of said spine and stiffening corrugations extend between the terminal end portions of the tray walls adjacent the spine to strengthen the album in the vicinity of the spine and said corrugations being of insufficient size to obscure the visible indicia on the cassette seen through the spine.

4. The book-style album of claim 2 wherein the tray wall includes cassette holding projections extending longitudinally of the spine from the tope and bottom portions of the tray walls closest to the spine to serve as stops for bracing the cassette and the stops terminate in close proximity to the top and bottom of the spine to provide said open center area between the stops allowing the center portion of the cassette between the stops to be seen through the spine due to the clear visibility of the printed indicia afforded by the open center area between adjacent ends of the stops.

5. The album of claim 2 wherein said album is provided with longitudinally extending laterally spaced apart parallel spine rules defining hinges on either side of said spine and stiffening corrugations extend between the terminal end portions of the tray walls adjacent the spine to strengthen the album in the vicinity of the spine but said corrugations being of insufficient size to obscure the visible indicia on the cassette seen through the spine.

6. The album of claim 2 wherein both the front and rear cover are provided with cooperating interconnecting tray walls, each including at least three wall sections comprising top and bottom walls extending laterally and a vertically extending wall adjacent a free edge of each of said covers, said tray walls comprise inwardly deflected thermally formed channel-shaped projections in the wall of said album.

7. The album of claim 6 wherein said album is formed from a first inner tray sheet comprising a relatively stiff thermoformable sheet material and a second relatively pliable, soft and flexible flat sheet bonded by means of an edge seam to at least three edges of the tray sheet.

8. The album of claim 7 wherein the second outlet sheet comprises a trap sheet having a free upper edge adapted to be pulled away from the tray sheet for the insertion of printed sheet material between the tray sheet and the second outer sheet.

9. The album of claim 2 wherein a pair of longitudinally extending parallel spine rules are provided on either side of said spine to define hinges between said spine and front and rear covers of said album and a linear corrugation extends longitudinally of said album adjacent to each of the spine rules to stiffen the open center portion of the album and the spine without obstructing the view of a cassette or other object within the album when viewed through the transparent spine.

* * * * *

UNITED STATES PATENT AND TRADEMARK OFFICE
CERTIFICATE OF CORRECTION

PATENT NO. : 4,784,264

DATED : November 15, 1988

INVENTOR(S) : Philip K. Sykes

It is certified that error appears in the above-identified patent and that said Letters Patent is hereby corrected as shown below:

On the title page Insert

--(73) Assignee: Blackbourn, Inc., Eden Prairie, Minn. --.

Claim 5, ljne 1, change "2" to -- 1 --.
Claim 7, line 4, after "flat" insert -- outer --.
Claim 8, line 1, change "outlet" to -- outer --.
Claim 9, line 1, change "2" to -- 7 --.

Signed and Sealed this

Twenty-fifth Day of April, 1989

Attest:

DONALD J. QUIGG

*Attesting Officer*   Commissioner of Patents and Trademarks